March 17, 1931. F. MÜLLER 1,796,661
CHAIN GEARING
Filed June 5, 1922 2 Sheets-Sheet 1
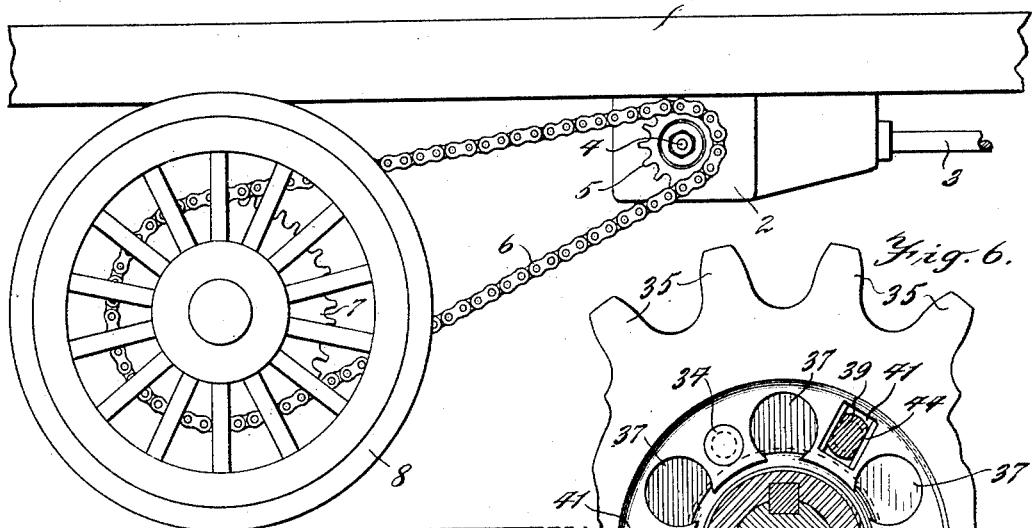
Fig. 1.
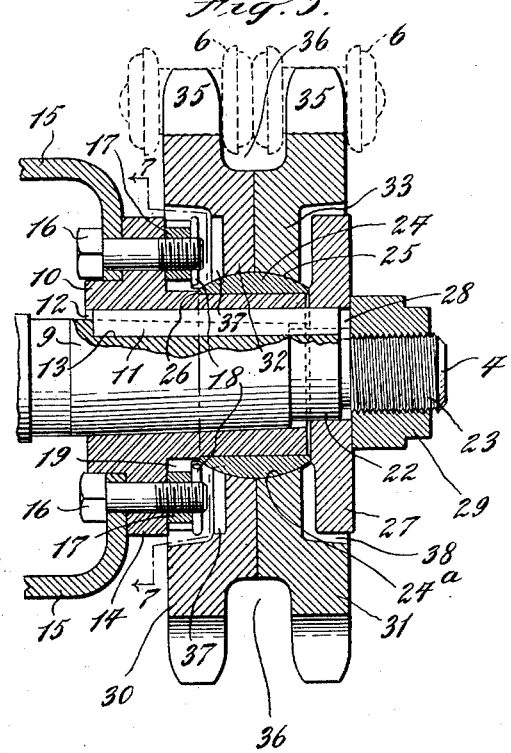
Fig. 5.
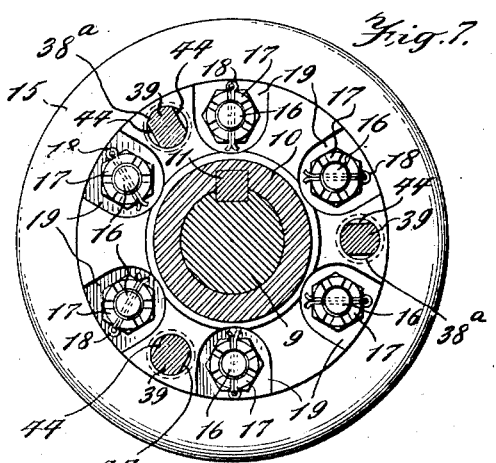
Fig. 6.
Fig. 7.
INVENTOR.
Friederich Müller
BY
Gifford Bull
his ATTORNEYS March 17, 1931.      F. MÜLLER      1,796,661
CHAIN GEARING
Filed June 5, 1922      2 Sheets-Sheet 2
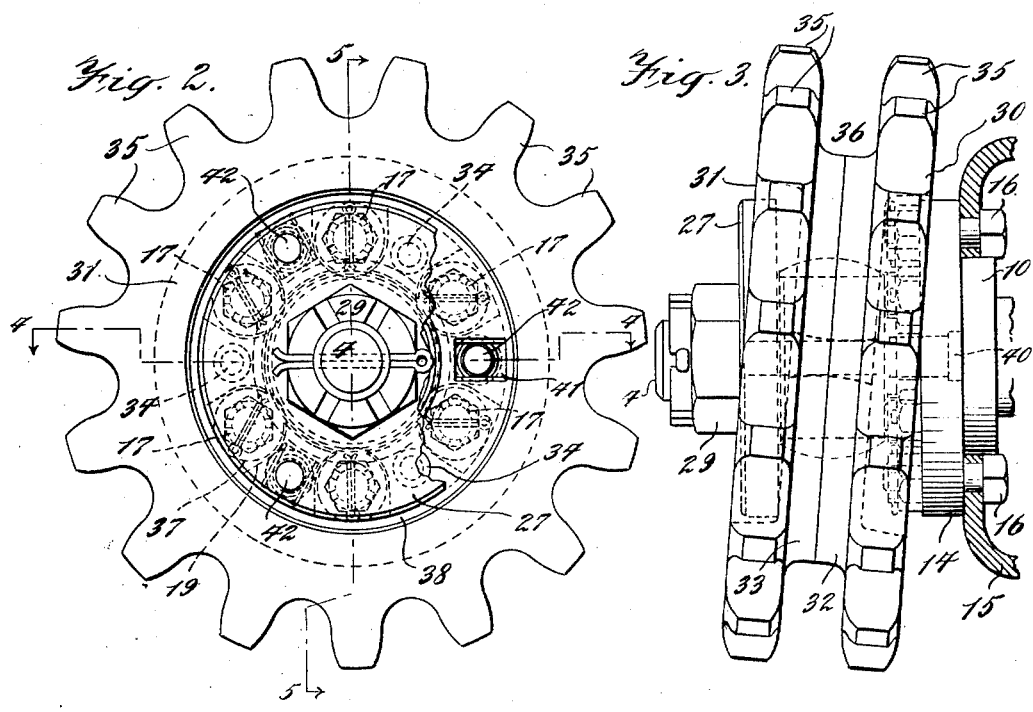
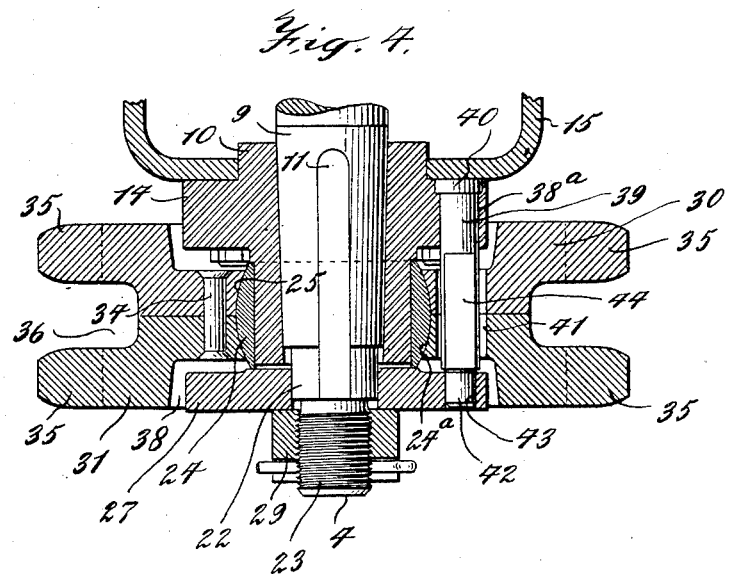
INVENTOR.
Frederick Müller
BY
Gifford & Bull
ATTORNEYS Patented Mar. 17, 1931

1,796,661

UNITED STATES PATENT OFFICE

FRIEDERICH MÜLLER, OF HARTFORD, CONNECTICUT, ASSIGNOR TO THE WHITNEY MANUFACTURING COMPANY, OF HARTFORD, CONNECTICUT, A CORPORATION OF CONNECTICUT

CHAIN GEARING

Application filed June 5, 1922. Serial No. 566,103.

My invention relates to new and useful improvements in chain gearing, and while capable of general application within its scope, will be found particularly applicable for use in chain transmission gearing for transmitting power from the transmission shaft of an automobile or truck to a sprocket or toothed wheel carried by a driven axle.

One object of the invention, among others, is to provide a novel form of gearing in which the gears over which a chain travels will be caused to align at all times, so that the chain will run straight between the gears. The invention will be found particularly applicable to chain-drive motor vehicles of the type embodying a transverse transmission or gear shaft driven by a motor, and which carries a driving sprocket connected by a drive chain to a driven sprocket on a wheel axle. As is well known, in drives of the character mentioned, the driven sprocket on the wheel axle is constantly being thrown out of alignment with the driving sprocket, due to the fact that the axle responds to inequalities in the road, which results in the axle being inclined to the horizontal or its normal position and the driven axle thrown out of alignment with the driving axle, so that the driven sprocket takes an inclined position, throwing it out of alignment with the driving sprocket and causing the chain to be thrown out of its normal path, and thereby subjected to severe strains, resulting in stretching, and even breakage. By my invention the gears are maintained in alignment and the chain caused to travel in a correct path at all times. The invention consists in the improvements to be more fully described hereinafter and the novelty of which will be particularly pointed out and distinctly claimed. I have fully and clearly illustrated a preferred embodiment of my invention in the accompanying drawings, to be taken as a part of these specifications, and wherein:

Figure 1 is a side elevation of a motor-vehicle drive showing my invention applied thereto.

Figure 2 is a front view, with parts broken away, of an embodiment of my invention.

Figure 3 is a view in side elevation showing a gear embodying my invention in compensating position.

Figure 4 is a section on the line 4—4 of Figure 2.

Figure 5 is a section on the line 5—5 of Figure 2.

Figure 6 is a section on the line 7—7 of Figure 5, and looking toward the right.

Figure 7 is a section on the line 7—7 of Figure 5, and looking toward the left.

Referring to the drawings by characters of reference, 1 designates a motor-vehicle frame, from the under side of which is suspended or supported a transmission-gear box 2, containing a transmission gear of any suitable type, driven by a motor (not shown) through a drive shaft 3, and 4 designates one end of a transmission shaft driven from the transmission gear, upon which shaft is mounted a sprocket or toothed wheel 5. The wheel 5 is connected by a sprocket chain 6 with a sprocket wheel 7, mounted on an axle (not shown), of a driving wheel 8, or said wheel 7 may be connected directly to said wheel 8 by any means well known in the art. It will be understood that the body or frame of the vehicle is suitably supported on the axle of the wheel 8.

In the present embodiment, the structure described is employed only to illustrate one embodiment of my invention, as the latter is not limited in its uses to motor-vehicle drives.

I will now proceed to describe a preferred embodiment of my invention as applied to the construction of the sprocket gear 5. 9 designates the conical end portion of a power-transmitting shaft 4, upon which is arranged a sleeve 10, said sleeve being keyed to the shaft by a longitudinal key 11 set in grooves 12 and 13 in said sleeve and shaft, respectively. One end of the sleeve is provided with a lateral flange 14, to which is secured a brake-flange or drum 15, which surrounds said sleeve and is connected to said flange by means of headed bolts 16 passing through openings in the sleeve and flange and carrying clamping nuts 17, which serve to clamp the sleeve and flange rigidly together. The nuts 17 are held in clamping position by cross-keys 18 extending through openings in the bolts and seated in transverse slots in said nuts. Other nut-locking means may be employed within the scope of my invention. The nuts are preferably seated in recesses 19 formed in the outer face of said flange 14, whereby a compact structure is afforded. The outer end of the conical shaft portion 9 projects beyond the outer end of the sleeve 10, as does, also, the key 11; the said outer end of the conical portion 9 being reduced, as at 22, and also provided with a threaded end extension 23.

Surrounding and fitting the sleeve 10 is a bearing member in the form of a bushing 24 having a spherical outer surface 25, the inner end of said bushing abutting an annular shoulder 26 on the sleeve 10 and being held against said shoulder by a circular plate 27 arranged on the shaft part 22, and having a recess 28 to receive the key 11, whereby said plate rotates with the shaft. The plate 27 is urged inward to hold the bushing in place, by means of a suitable lock-nut 29 threaded on the part 23 of the shaft. The bushing is of sufficient length and there is enough clearance between the plate 27 and the end of the sleeve 10 so that said plate will have proper movement to clamp the bushing against the shoulder 26. The toothed member of the gear comprises a pair of discs 30, 31 having central disc or hub portions 32, 33, which are clamped and held rigidly together by means of rivets 34 passing through said parts 32, 33 and headed over, as shown, on the outer faces thereof.

The discs 30, 31 are each provided with a circumferential row of sprocket teeth 35—35, said rows being spaced from each other to provide a circumferential channel or groove 36. These rows of teeth are arranged to cooperate with the openings and transverse members of a double sprocket chain 6, shown in dotted lines in Fig. 5 and in full lines in Fig. 1. While I have illustrated and described two discs 30 and 31 having sprocket teeth engaging a double sprocket chain, it will, of course, be understood that my invention is equally applicable to a single disc having teeth cooperating with a single chain.

The hub portion formed by the parts 32, 33 is formed with a central spherical opening 24ª to receive and fit the bushing 24, the arrangement being such that the gear may not only rotate with said bushing but may rock laterally thereon in either direction. The sprocket gear is made in two sections, so as to facilitate assembly of the same on the spherical bushing, each having a spherical socket, which sockets register to form the bearing opening 24ª.

The member 30 is formed with annularly-arranged recesses 37 to receive the projecting nuts 17, and the member 31 is provided with an annular recess 38 on its outer face to receive the plate 27, whereby a compact structure is afforded.

The driving connection between the gear member and the shaft is as follows: The flange 14 of the rotary sleeve 10 is formed with openings 38ª, arranged preferably in the thicker portions of said flange between the said recesses 19, and through each of these openings extends a bolt or pin 39 having a head 40, said pins being inserted from the rear face of the flange 14 and held in place by the brake-drum or flange 15, as clearly shown in Fig. 4. These pins 39 are arranged parallel to the axis of rotation of the shaft 4 and are projected through radial openings, preferably in the form of slots 41, in the webs of the members 30, 31, the outer ends of said pins being reduced, as at 42, and seated in openings 43 in the plate 27. It will be seen that said pins 39 will be rotated with the shaft and that power will be exerted equally by the flange 14 and plate 27 on both ends of said pins.

In order that the gear may rock on its spherical bearing bushing, the slots 41 are of greater length than the radial diameter of said pins taken through the axis of rotation, and the sides of the pins are preferably flat-faced, as at 44, where they contact with the sides of the slots, whereby a proper sliding contact and fit is afforded.

From the above description it will be seen that the gear is so constructed and arranged as to be freely rockable laterally on the shaft 4, and that an efficient driving connection is at all times maintained between the gear and shaft. In the embodiment shown, should the gear 7 be thrown out of alignment with the driving gear 5 constructed as described, in accordance with my invention, the latter will rock laterally in one direction or the other to align itself with the gear 7 and the runs of the chain will be guided in a straight path between such gears.

It will also be noted that in the drive which I have described above, the shaft 4 and the shaft or axle upon which the sprocket 7 is mounted, are vertically movable relative to each other and are also movable relative to each other around a horizontal axis. These relative motions come about partly because the shaft 4 is mounted on the frame 1 of the vehicle, whereas the axle is carried by the wheel which contacts directly with the roadway. There is thereby produced a relative vertical movement between these two shafts.

There is a relative movement between these two shafts about a horizontal axis because of variations in the roadway and because of the rocking which the vehicle frame is subjected to on account of the usual springs between the frame and the wheels. These two relative movements between the shaft 4 and axle normally would throw the sprocket 5 and the sprocket 7 out of alinement, as above explained. The sprockets 5 and 7 each has a plurality of rows of teeth with which the chain links engage and because of the width of the chain connection the relative movements above mentioned cause unusual strains to be placed upon the chain. My invention eliminates such strains and enables the chain links to remain in operative engagement with the sprocket teeth under all conditions.

What I claim and desire to secure by Letters Patent of the United States is:

1. In combination, a rotary member, a gear member mounted thereon and having rocking movement laterally with respect thereto and formed with a slot extending parallel to the axis thereof, a pin passing through and beyond said gear at each of its ends and means for securing the ends of said pin to said rotary member.

2. In combination, a rotary member, a sprocket gear mounted thereon for lateral rocking movement relative to said member, a flange member and a plate member mounted on said rotary member to rotate therewith, and a driving pin seated in said flange member and plate member and extending through an opening in said gear.

3. In combination, a rotary member, a sprocket gear mounted thereon for lateral rocking movement relative to said member, a flange member and a plate member mounted on said rotary member to rotate therewith, and a driving pin seated in said flange member and plate member and extending through a radial slot in said gear.

4. In combination, a rotary member, a sprocket gear mounted thereon for lateral rocking movement relative to said member, a flange member and a plate member mounted on said rotary member to rotate therewith, said gear having radial slots, and driving pins carried by said flange member and plate member and extending through said radial slots.

5. In combination, a rotary member, a sleeve on said member and connected thereto, a flange on said sleeve, a plate member on said rotary member and connected thereto, a spherical bearing member on said sleeve between said flange and plate member, a sprocket gear having a spherical bearing opening receiving said bearing member whereby the gear may rock laterally, and driving means connecting said flange and plate member to said gear.

6. In combination, a rotary member, a sleeve on said member and connected thereto, a flange on said sleeve, a plate member on said rotary member and connected thereto, a spherical bearing member on said sleeve between said flange and plate member, a sprocket gear having a spherical bearing opening receiving said bearing member whereby the gear may rock laterally, and driving pins connecting said flange and plate member to said gear.

7. In combination, a rotary member, a sleeve on said member and connected thereto, a flange on said sleeve, a plate member on said rotary member and connected thereto, a spherical bearing member on said sleeve between said flange and plate member, a sprocket gear having a spherical bearing opening receiving said bearing member whereby the gear may rock laterally, and driving pins carried by said flange and plate member and extending through openings in said gear connecting said flange and plate member to said gear.

8. In combination, a rotary member, a sleeve on said member and connected thereto, a flange on said sleeve, a plate member on said rotary member and connected thereto, a spherical bearing member on said sleeve between said flange and plate member, a sprocket gear having a spherical bearing opening receiving said bearing member whereby the gear may rock laterally, and driving pins carried by said flange and plate member and extending through radial slots in said gear connecting said flange and plate member to said gear.

9. In combination, a rotary member, a sleeve on said member and connected thereto, a flange on said sleeve, a plate member on said rotary member and connected thereto, a spherical bearing member on said sleeve between said flange and plate member, a sprocket gear having a spherical bearing opening receiving said bearing member whereby the gear may rock laterally, and driving pins carried by said flange and plate member and extending through radial slots in said gear connecting said flange and plate member to said gear, said pins having flat sides slidably fitting the sides of said slots.

10. In a chain drive, the combination of a shaft, a sprocket mounted on said shaft, a second shaft, a sprocket operatively connected with said shaft, said shafts being vertically movable relative to each other and also movable relative to each other around a horizontal axis passing through said shafts, each of said sprockets having a plurality of rows of chain-engaging teeth, a chain connection having links engaging said sprocket teeth and means whereby the links of said chain connection remain in operative contact with said sprockets notwithstanding the said relative movements between said shafts.

11. In a chain drive for vehicles, the combination of a shaft mounted on the vehicle frame, a shaft directly connected with the vehicle wheels, a sprocket mounted on said shaft, said shafts being vertically movable relative to each other and also movable relative to each other around an axis passing through said shafts, said sprockets being angularly movable with respect to each other, each of said sprockets having a plurality of rows of chain-engaging teeth, a chain connection having links engaging said sprocket teeth and means whereby the links of the chain connection remain in operative contact with said sprockets notwithstanding the said relative movements of said shafts.

12. In a chain drive for vehicles, the combination of a shaft mounted on the vehicles chassis, a sprocket on each end of said shaft, driving wheels for said vehicle, sprockets operatively connected with each of said wheels, said first-mentioned sprockets being normally in alinement with the sprockets of said wheels, the sprockets on each side of the vehicle being vertically movable relative to each other and also movable relative to each other around an axis passing through said wheels, each of said sprockets having a plurality of rows of chain-engaging teeth, a chain connection having links engaging said sprocket teeth and means whereby each of said first-mentioned sprockets moves relative to its axis of rotation to remain in alinement with its corresponding sprocket on the wheel during said relative movements between said sprockets.

13. In a chain drive, a driving shaft, a sprocket mounted thereon, a driven shaft, a sprocket operatively connected thereto, said shafts being vertically movable relatively to each other and also movable relative to each other around horizontal axes passing through said shafts, said sprockets being angularly movable relatively to each other, each of said sprockets having a plurality of rows of chain engaging teeth, and a double chain comprising links engaging the teeth of the respective sprockets.

14. In a chain drive, a driving shaft, a sprocket mounted thereon, a driven shaft, a sprocket operatively connected thereto, said shafts being vertically movable relatively to each other and also movable relative to each other around horizontal axes passing through said shafts, said sprockets being angularly movable relatively to each other, each of said sprockets having a plurality of rows of chain engaging teeth, and a double chain comprising links engaging the teeth of the respective sprockets, whereby twisting of the sprocket chain may be permitted.

15. In combination, a vehicle comprising a frame, a chain drive, a driving shaft having its axis fixed with respect to the frame of said vehicle, a relatively small sprocket mounted on said shaft and movable laterally with respect to the axis thereof, a driven shaft, a relatively large sprocket operatively connected to said driven shaft, said shafts being vertically movable relatively to each other and also movable relative to each other around horizontal axes passing through said shafts, and a sprocket chain engaging said sprockets, the sprocket mounted on said driving shaft being movable by said sprocket chain.

FRIEDERICH MÜLLER.